United States Patent [19]

Ajam et al.

[11] 4,122,387

[45] Oct. 24, 1978

[54] APPARATUS AND METHOD FOR SIMULTANEOUSLY LOGGING AN ELECTRICAL CHARACTERISTIC OF A WELL FORMATION AT MORE THAN ONE LATERAL DISTANCE FROM A BOREHOLE

[75] Inventors: Sami O. Ajam; Benjiman R. McCarty, both of Duncan, Okla.

[73] Assignee: Halliburton Company, Duncan, Okla.

[21] Appl. No.: 827,283

[22] Filed: Aug. 24, 1977

[51] Int. Cl.² ............................................. G01V 3/18
[52] U.S. Cl. ...................................................... 324/10
[58] Field of Search ...................................... 324/10, 1

[56] References Cited

U.S. PATENT DOCUMENTS

| | | | |
|---|---|---|---|
| 2,880,389 | 3/1959 | Ferre et al. | 324/1 |
| 3,075,142 | 1/1963 | Albright et al. | 324/1 |
| 3,262,050 | 7/1966 | Threadgold et al. | 324/10 |
| 3,365,658 | 1/1968 | Birdwell | 324/10 |
| 3,390,323 | 6/1968 | Kisling | 324/10 |
| 3,462,679 | 8/1969 | Attali | 324/10 |
| 3,579,098 | 5/1971 | Mougne | 324/10 |
| 3,660,755 | 5/1972 | Janssen | 324/10 |
| 3,760,260 | 9/1973 | Schuster | 324/10 |

*Primary Examiner*—Gerard R. Strecker
*Attorney, Agent, or Firm*—Floyd A. Gonzalez; John H. Tregoning

[57] ABSTRACT

A method and apparatus is disclosed wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems.

13 Claims, 3 Drawing Figures

APPARATUS AND METHOD FOR SIMULTANEOUSLY LOGGING AN ELECTRICAL CHARACTERISTIC OF A WELL FORMATION AT MORE THAN ONE LATERAL DISTANCE FROM A BOREHOLE

BACKGROUND OF THE INVENTION

This invention relates to methods and apparatus for measuring an electrical property of earth formations intersected by a borehole, and more particularly for simultaneously measuring an electrical property at different lateral distances from the borehole with "guard electrode" type investigating devices.

It is known that if measurements of formation resistivity are made at several lateral distances from a well bore, characteristics of the formation for producing oil and gas can be determined. A deep measurement will give apparent formation resistivity, $R_a$, a shallow measurement will give the invaded zone resisitivity, $R_i$, while a very shallow measurement of the formation immediately adjacent the borehole will give flushed zone resistivity, $R_{xo}$.

The resistivity values may be used to determine when invasion has taken place, thereby detecting zones that have some permeability. Among other information, these logs are useful in detecting movable hydrocarbons present in the formation intersected by the borehole.

Long spaced and short spaced electrode systems have been used to measure some of these parameters. Guard electrode systems whereby current has been focused into a thin sheet to flow at a desired depth in the formation have been developed.

An electrode array using a plurality of electrodes, and varying one of the survey or auxiliary currents to establish and maintain a desired potential distribution for focusing a survey current to a desired depth in a formation has also been developed. As disclosed in U.S. Pat. No. 3,798,533 to Schuster, measuring the potential difference between various pairs of the electrodes in such an electrode array the resistivity of the noninvaded zone and the invaded zone may be determined.

The simultaneous use of long guard and short guard electrode systems has been suggested as showing promise for making resistivity measurements at different radial distances from the borehole, but no method for implementing this suggestion has been disclosed.

The combination of electrode systems with focused induction coils for logging two depths from a borehole have been disclosed, and a dual induction coil system has also been developed.

The dual induction coil apparatus is most preferred for use in boreholes filled with fresh mud. An apparatus using dual guard electrode systems is most preferred in boreholes filled with high salinity mud, and where high resistivity formations are encountered; although its use should not be understood to be limited to those applications.

In the present apparatus disclosed herein, two guard electrode systems are used, one having long guard electrodes for focusing the formation current emitted from an alpha ring between the long guard electrodes deep into the formation to be measured, and one having short guard electrodes for focusing the formation current emitted from an alpha ring between the short guard electrodes to a shallow depth into the formation to be measured. Deep and shallow are, of course, relative terms. The deep guard electrodes may be designed to measure the uninvaded formation, and the shallow guard electrodes may be designed to measure the invaded zone of the formation.

A circuit is disclosed which uses a single oscillator which simultaneously controls both the deep formation current and the shallow formation current to have the same frequency.

The logging cable armor acts as the current return for one guard electrode system, while a cable electrode immediately above the apparatus acts as the current return for the other guard electrode system.

In one embodiment, reference voltages for both guard electrode systems are taken between the guard electrode systems and a cable electrode located between the cable armor acting as a current return and the mentioned cable electrode acting as a current return.

In another embodiment, the reference voltage for one guard electrode system is taken between the guard electrodes of that system and a cable electrode located between that portion of the logging cable acting as a current return and the mentioned current return cable electrode. The reference voltage for the other guard electrode system is taken between the guard electrodes of that other system and a cable electrode on the logging cable located between the guard electrode systems and the mentioned current return cable electrode.

It has been found that a pad mounted electrode measuring system may be run with the dual guard electrode apparatus to make a simultaneous log of the flushed zone immediately adjacent the borehole without interfering with logs being made of the other desired depths by the guard electrode systems.

BRIEF DESCRIPTION OF THE DRAWINGS

A brief description of the drawings is as follows.

PREFERRED EMBODIMENT

Figure 1:
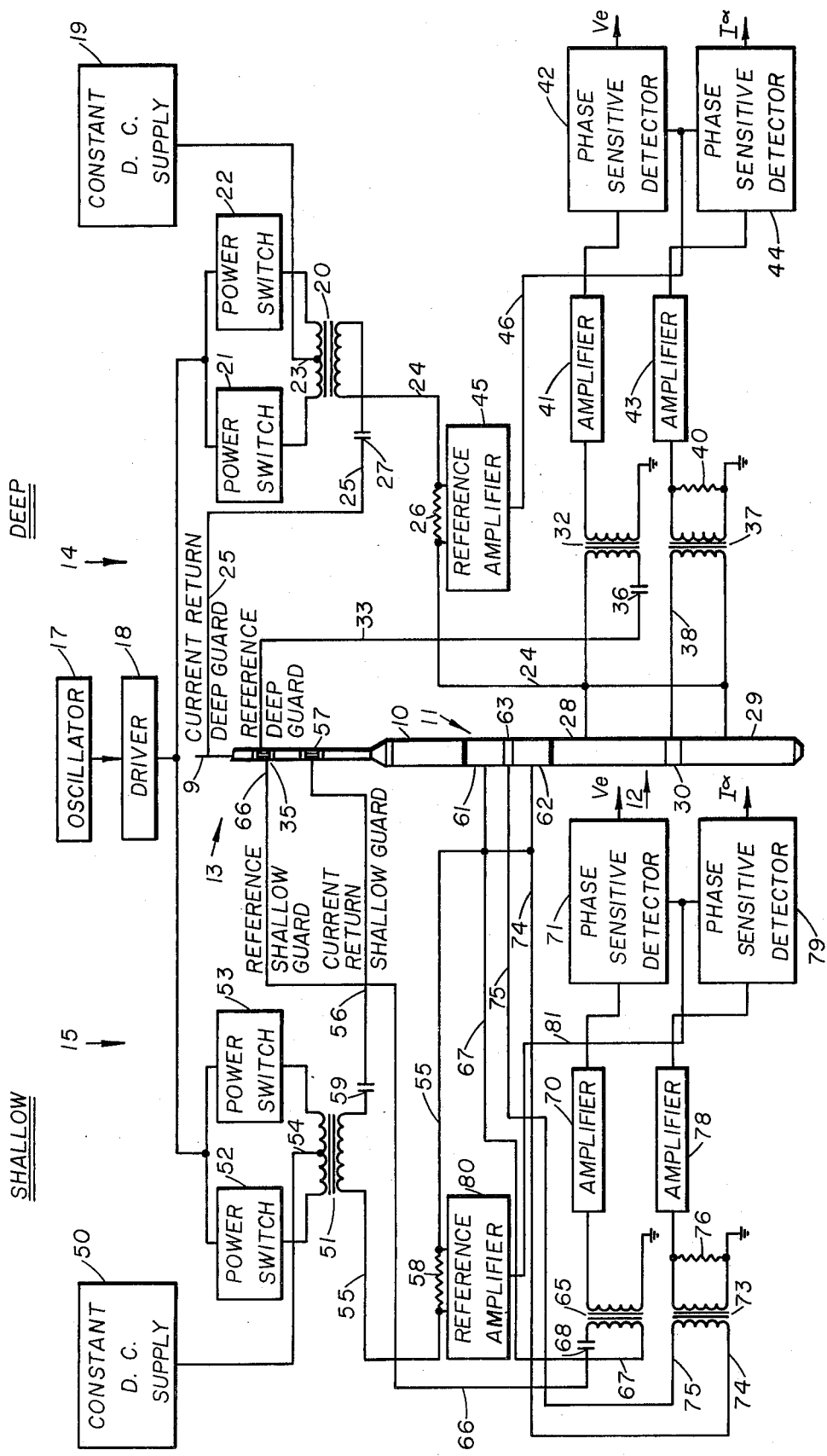
FIG. 1 depicts schematically one arrangement of the invention showing a logging cable, a logging sonde having two guard electrode systems thereon at the end of the cable, and a cable electrode assembly above the logging sonde on the logging cable.
Figure 2:
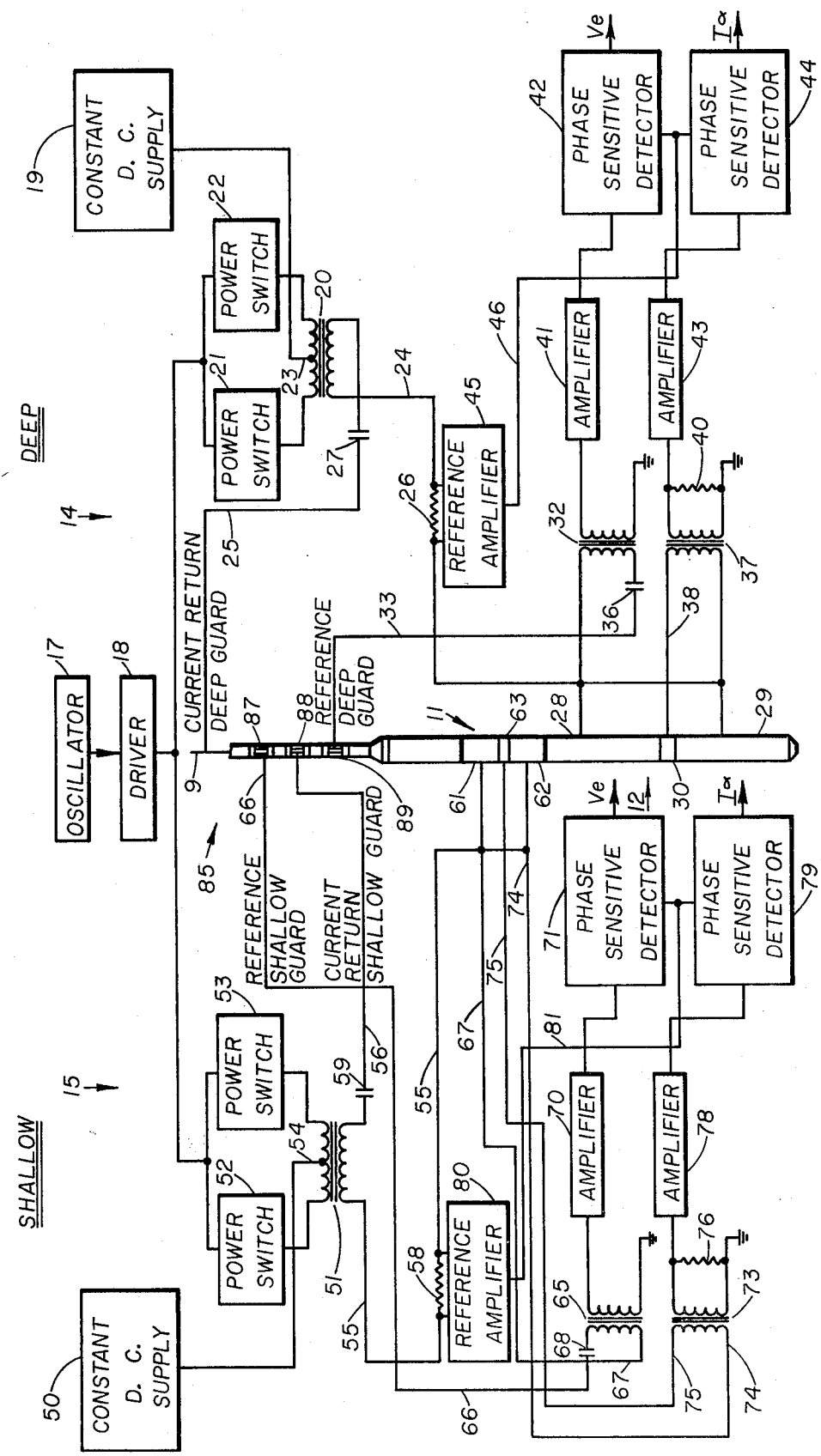
FIG. 2 depicts schematically another arrangement of the invention, wherein the reference voltages are measured from separate cable electrodes in the cable electrode assembly.

The preferred embodiments of the dual guard logging apparatus are illustrated in FIGS. 1 and 2. In FIG. 1, a logging cable 9 is lowered into a well bore having logging sonde 10 attached for conducting well logging operations. The logging sonde 10 includes a shallow investigating electrode system 11 and a deep investigating electrode system 12. The shallow guard electrode system 11 includes guard electrodes 61 and 62 and alpha ring 63, and the deep guard electrode system 12 includes guard electrodes 28 and 29 and alpha ring 30. As is known in the art, the formation current from the alpha ring positioned between two guard electrodes of equal length is focused to flow into the formation in the form of a thin disc, the penetration of the formation current dependent upon the length of the guard electrodes. The focusing of the formation current is accomplished by having essentially the same potential on all surfaces of the tool, and a current return such that current flowing from the alpha ring to the current return is focused to flow at the desired depth through the formation by current from the guard electrodes.

In the illustrative embodiment, the overall length of the deep investigating guard electrode system 12 is approximately 10 feet, and the alpha ring 30 of system 12 is approximately 3 inches long. The shallow investigating guard electrode system 11 is approximately 32 inches long, and the alpha ring 63 for system 11 is approximately 1 inch long.

Shown in FIG. 1, immediately above the logging sonde 10, is a cable electrode system 13 including two cable type electrodes 35 and 57. These cable type electrodes are insulated from each other and insulated from the logging cable 9. Logging cable 9 also serves as the current return for the deep investigating guard log system.

As is known by those skilled in the art, operating power for the electronics is transmitted to the logging sonde through a conductor in logging cable 9, and data bearing information is detected by electronics in the sonde and transmitted to the surface through the logging cable 9. The electronic circuit used is illustrated in FIGS. 1 and 2 as the deep investigating electronic system 14 and the shallow investigating electronic system 15. An oscillator 17 and a driver 18 are common to both deep investigating electronics 14 and shallow investigating electronics 15 as illustrated in both FIGS. 1 and 2; the preferred oscillator providing a signal of 1,000 Hz to both circuits.

Turning now to the deep investigating electronic system 14, a constant DC supply 19 is provided which supplies constant current to the deep formation being measured over that portion of the dynamic range of the apparatus wherein the resistivity of the formation is low, and provides a constant voltage to the deep formation being measured over that portion of the dynamic range where the formation resistivity is high. A transformer 20 for supplying formation current is provided wherein parallel power switches 21 and 22 are connected across the primary coil. Power switches 21 and 22 are both connected to the oscillator and driver circuits 17 and 18. The constant DC supply 19 is connected to a center tap 23 on the primary of transformer 20 as shown in FIG. 1. It can thus be seen that the formation current supplied by the secondary of transformer 20 will be a signal oscillating at the frequency of oscillator 17 and having constant current when the formation being measured has a lower resistivity and a constant voltage when the formation being measured has a higher resistivity.

Conductor 24 leads from the secondary of transformer 20 to the guard electrodes 28 and 29. A conductor 25 leads from the secondary of transformer 20 to the logging cable 9 which acts as a current return for deep formation current. A series resistor 26 appears in the conductor 24, whose use will be explained later.

A coupling capacitor 27 appears in series in the conductor 25 to prevent DC currents from circulating in the circuit.

It will be noticed that upper guard electrode 28 and lower guard electrode 29 are connected directly to conductor 24 and thus are at the same potential.

Transformer 32 is included in the circuit to provide a reference voltage signal, $V_e$. The primary of transformer 32 is connected to conductor 24 and to the reference electrode 35 in the cable electrode assembly 13 by conductor 33. A coupling capacitor 36 is included in series in conductor 33 to block DC current from flowing in the circuit.

An alpha ring 30 is provided in the deep investigating electrode system 12 to inject formation current into the formation. A current transformer 37 is provided to measure the formation current and supply an alpha current signal, $I_a$. The primary of current transformer 37 is connected to conductor 24 and to alpha ring 30 by conductor 38. Thus it can be seen that formation current flows from the secondary of transformer 20, through conductor 24, through the primary of transformer 37, to alpha ring 30 through conductor 38, is injected into the formation to be measured, returns to the logging cable 9, and returns through conductor 25 back to the primary of transformer 20.

A resistor 40 is provided across the secondary of current transformer 37 to give an alpha current signal which is amplified by amplifier 43. The $V_e$ signal of the voltage which appears between the guard electrodes 28 and 29 and the reference electrode 35 on cable electrode assembly 13 is picked up by transformer 32 and is amplified by amplifier 41.

The voltage signal $V_e$ appearing at the output of amplifier 41 is presented to a phase sensitive detector 42 which presents a varying DC signal in phase with the formation current for transmission to the surface. Likewise, the formation current signal $I_a$ appearing at the output of amplifier 43 is presented to phase sensitive detector 44 for presenting a varying DC signal in phase with the formation current. Both the $V_e$ signal and the $I_a$ signal output from phase detectors 42 and 44 respectively are transmitted to the surface for processing and display in a conventional manner as will be understood by those skilled in the art.

The reference amplifier 45 amplifies the voltage drop across resistor 26 and presents this amplified voltage through conductor 46 to control the phase sensitive detectors 42 and 44. It will be understood that the voltage drop across resistor 26 will be proportional and in phase with the formation current flowing in line 24.

The electronic circuit for the shallow investigating electronic system 15 is similar to that of deep investigating electronic circuit 14, except that the guard electrodes 61 and 62 are of a shorter length to focus the formation current emanating from ring electrode 63 such that the formation current will pass through earth formations nearer the logging sonde 10. Also, the shallow formation current is returned to current electrode 57 which is below the reference electrode 35 in cable electrode assembly 13.

A constant DC supply 50 is provided which is similar to the DC supply 19 as discussed above. Similarly, constant DC supply 50 is connected to a center tap 54 of a transformer 51. The primary of transformer 51 is connected to two parallel power switches 52 and 53, both of which are connected to the oscillator 17 and driver 18. One side of the secondary coil of transformer 51 is connected to the current return electrode 57 of the cable electrode 13 by conductor 56. The other side of the transformer secondary is connected to guard electrodes 61 and 62 by conductor 55. A series resistor 58 is provided in conductor 55 for providing a voltage drop which is proportional to and in phase with the alpha current flowing through the shallow formation.

A coupling capacitor 59 is provided in conductor 56 to prevent DC currents from flowing in the circuit.

A voltage signal transformer 65 for providing signal $V_e$ has its primary coil connected to conductors 66 and 67, which in turn are connected to reference electrode 35 and conductor 55 respectively. Conductor 55 is connected to guard electrodes 61 and 62 to maintain them at the same potential. A coupling capacitor 68 is also provided in conductor 66 to prevent DC currents from flowing in the circuit.

The reference voltage signal $V_e$ which appears at the secondary of transformer 65 is amplified by amplifier 70 and presented to phase sensitive detector 71. As discussed previously, phase sensitive detector 71 provides a varying DC voltage which is in phase with the transformer current. The output of detector 71 is then transmitted to the surface for processing and display.

Alpha ring 63 is provided in shallow electrode system 11 for injecting formation current into the formation to be measured. Current is provided to alpha ring 63 by conductor 75, through the primary of a current transformer 73, and the conductor 74 from conductor 55.

Formation current flows from alpha ring 63 as a thin focused disc through the shallow formation and returns to cable electrode 57, and then through conductor 56 to the secondary of transformer 51 as described earlier.

Formation current flowing through the primary of current transformer 73 produces a signal $I_a$ across resistor 76, which resistor is in parallel with the secondary coil of current transformer 73 as shown in FIG. 1.

The formation current signal $I_a$ is amplified by amplifier 78 and supplied to phase sensitive detector 79. The output of phase sensitive detector 79 is also transmitted to the surface for processing and display.

The voltage drop across resistor 58 is amplified by reference amplifier 80 and transmitted by conductor 81 to phase sensitive detectors 71 and 79 for control. It will be understood that this control voltage as amplified by amplifier 80 is proportional to and in phase with the formation current flowing through conductor 55.

The apparatus displayed in FIG. 2 is identical to that displayed in FIG. 1 with the exception of the configuration of cable electrode assembly 85. Electrode assembly 85 has three cable electrodes as opposed to the electrode assembly 13 of FIG. 1 which has two electrodes. Cable electrode 87 is the reference electrode for the shallow guard system and is connected to conductor 66 which is the same as that configuration shown in FIG. 1. Cable electrode 88 is connected to conductor 56 to act as a current return electrode for the shallow guard system.

A third cable electrode 89 is connected to conductor 33 to act as a reference electrode for the voltage signal $V_e$ of the deep guard electrode system.

As before, the logging cable 9 acts as a current return for the deep guard electrode system and is connected to conductor 25.

The configuration shown in FIG. 1 is the most preferred embodiment in that it has been found to be less sensitive to formations which display the Delaware effect than the configuration illustrated in FIG. 2. Thus, for formations intersected by a borehole which, when logged, exhibit the Delaware effect, the apparatus configuration shown in FIG. 1 is to be preferred. Both of the configurations illustrated in FIG. 1 and FIG. 2 have been found to give simultaneous logs of commercial quality for a formation at two lateral distances from the well logging sonde 10.

With this configuration it has been found that a simultaneous log of the formation resistivity at different lateral depths may be made wherein both logs are controlled by the same oscillator such that it is not necessary to provide a separate frequency to each guard log system. The cable electrode system for supplying return formation current for the deep investigating system and the shallow investigating system and for supplying reference electrodes for the voltage signal have been discovered such that standard cable electrode systems, such as are known in the art, may be used.

A pad type electrode system may be added below the logging sonde 10 to provide, in addition, an indication of the resistivity of the formation immediately adjacent a borehole.

Figure 3:
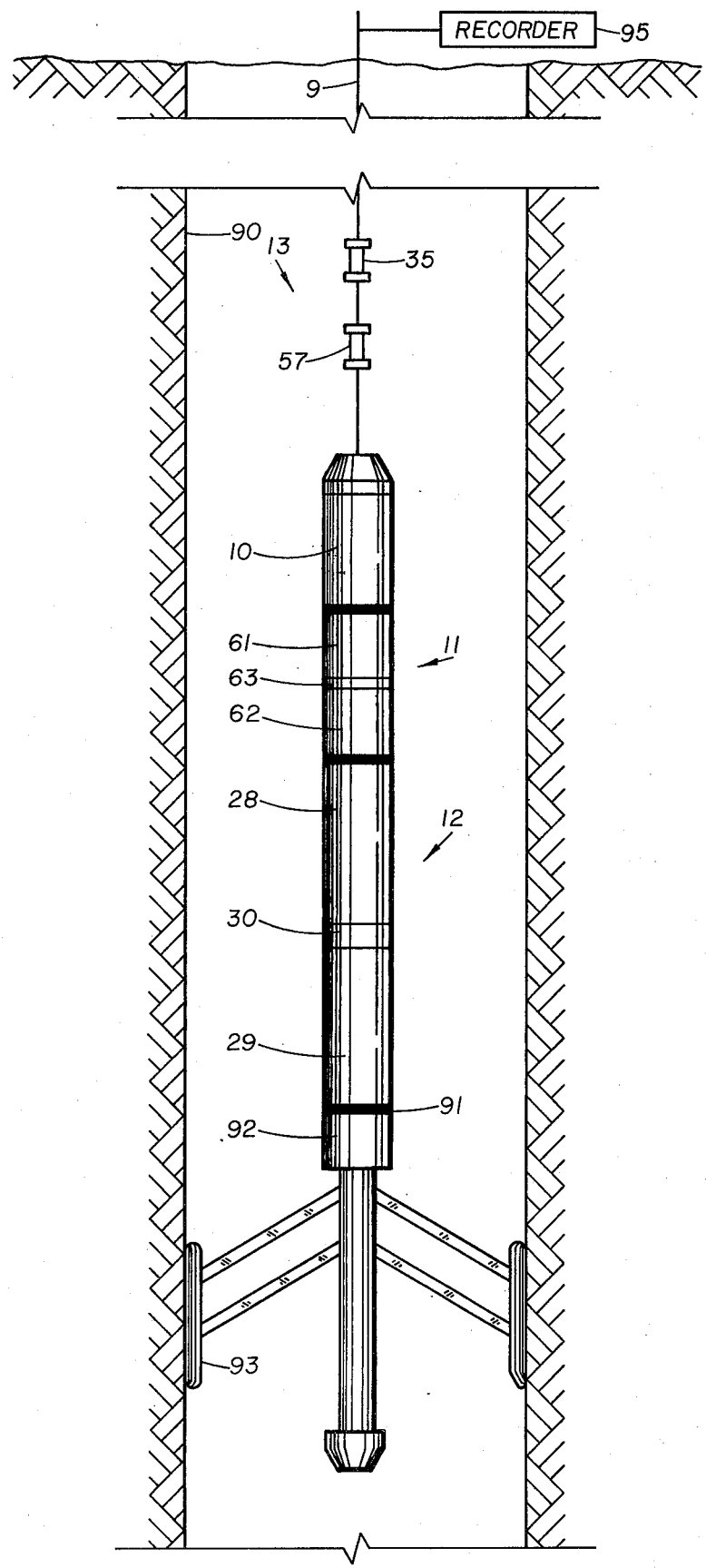
FIG. 3 depicts an apparatus of the present invention with a pad type electrode system, all for measuring an electrical property of the formation at three lateral distances from the borehole.

Such a configuration is illustrated in FIG. 3. The logging apparatus, including logging sonde 10 having shallow investigating guard electrode system 11 and deep investigating guard electrode system 12, is shown at the end of logging cable 9 in a borehole 90. An isolation connector 91 is located at the end of lower guard electrode 29 in deep investigating system 12. Below isolation connector 91 is a pad electrode device 92 which is well known to those skilled in the art having pad 93 which may be expanded from the logging apparatus body to press against the borehole wall.

It has been found that this pad type device may measure an electrical property of the zone of the formation immediately next to the borehole walls without interfering with the measurements being taken by electrode systems 11 and 12. Thus, measurements of the formation immediately next to the borehole, at a shallow distance from the borehole, and at a deep distance from the borehole may be taken and transmitted to the surface and displayed on recorder 95 by an appropriate recorder.

The disclosed embodiments are intended to be illustrative only. Other embodiments which work equally well and are equivalent to the embodiments shown may be imagined by one skilled in the art. For instance, the length of the guard electrode systems for focusing current at different depths may be varied, or a frequency different than that disclosed for the formation current may be chosen. The attached claims are intended to cover such equivalent embodiments of the invention which may occur to one skilled in the art.

What is claimed is:

1. A well logging apparatus for measuring electrical properties of a formation intersected by a well bore wherein the electrical properties of the formation at a shallow distance and a deep distance from the borehole are simultaneously measured for display, comprising:

an armored logging cable;
a logging sonde connected to the logging cable and arranged for movement in a borehole for logging the formation adjacent said borehole;
a first investigating guard electrode system on said sonde having guard electrodes for focusing current to flow through the formation at a first lateral distance from the borehole, and a first alpha ring between said guard electrodes for emitting said current into said formation;
a second investigating guard electrode system on said sonde, longitudinally spaced from said first investigating guard electrode system having guard electrodes for focusing current to flow through the formation at a second distance from the borehole, and a second alpha ring between said guard electrodes for emitting said current into said formation;
a first electrical current source means for supplying a first formation current to said first alpha ring;

a second electrical current source means for supplying a second formation current to said second alpha ring;

said first and second formation currents being emitted simultaneously from said first and second alpha rings;

oscillator means for controlling both said first electrical current source means and said second electrical current source means for imparting the same frequency to both of said first and said second formation currents;

a cable electrode on said armored logging cable and insulated from said logging cable for providing a current return for current emitted from the alpha ring of one of said investigating guard electrode systems; and wherein said armored logging cable provides a current return for current emitted from the alpha ring of the other of said investigating guard electrode systems and flowing in a path separate from the path of the current emitted from said one electrode system alpha ring.

2. The apparatus of claim 1 further comprising:

a cable electrode system on said armored cable above said logging sonde having two cable electrodes;

an electrical conductor connected from the armor of said armored cable to said first electrical current source means for providing a current return for said first formation current flowing from said first alpha ring to said logging cable armor through said formation;

first measuring means for measuring the voltage between one of the cable electrodes in said cable electrode system and the guard electrodes in said first investigating guard electrode system;

second measuring means for measuring the voltage between said one of the cable electrodes in said cable electrode system and the guard electrodes in said second investigating guard electrode system; and an electrical conductor connected from the other of said cable electrodes in said cable electrode system to said second electrical current source means for providing a current return for said second formation current flowing from said second alpha ring to said other cable electrode through said formation.

3. The apparatus of claim 2 wherein said one cable electrode is between that portion of the logging cable acting as the first formation current return and said other cable electrode.

4. The apparatus of claim 3 wherein the guard electrodes of said first investigating guard electrode system are longer than the guard electrodes of said second investigating guard electrode system for focusing the first formation current to flow in the formation at a greater lateral distance from said logging sonde than the second formation current.

5. The apparatus of claim 1 further comprising:

a cable electrode system on said armored cable above said logging sonde having three cable electrodes;

an electrical conductor connected from the armor of said armored cable to said first electrical current source means for providing a current return for said first formation current flowing from said first alpha ring to said logging cable armor through said formation;

first measuring means for measuring the voltage between a first one of said cable electrodes in said cable electrode system and the guard electrodes in said first investigating guard electrode system;

second measuring means for measuring the voltage between a second one of said cable electrodes in said cable electrode system and the guard electrodes in said second investigating guard electrode system; and an electrical conductor connected from the third one of said cable electrodes in said cable electrode system to said second electrical current source means for providing a current return for said second formation current flowing from said second alpha ring to said third cable electrode through said formation.

6. The apparatus of claim 5 wherein said third cable electrode is between said first and second cable electrodes of said cable electrode system.

7. The apparatus of claim 6 wherein said first cable electrode is between that portion of the logging cable acting as the first formation current return and said third cable electrode.

8. The apparatus of claim 7 wherein the guard electrodes of said first investigating guard electrode system are longer than the guard electrodes of said second investigating guard electrode system for focusing the first formation current to flow in the formation at a greater lateral distance from said logging sonde than the second formation current.

9. The apparatus of claim 1 further comprising pad mounted electrode measuring means carried by said sonde and arranged to be extended radially outwardly to contact the borehole walls for measuring electrical properties of the formation immediately adjacent the borehole.

10. A method of simultaneously measuring the electrical properties of a formation intersected by a borehole at two different lateral distances from the borehole comprising:

providing on a well logging sonde a first investigating guard electrode system having guard electrodes for focusing current to flow through the formation at a first lateral distance from the borehole, and a first alpha ring between said guard electrodes for emitting said current into said formation;

providing on said sonde, longitudinally spaced from said first investigating guard electrode system, a second investigating guard electrode system having guard electrodes for focusing current to flow through the formation at a second lateral distance from the borehole, and a second alpha ring between said guard electrodes for emitting said current into said formation;

providing a current return for a first formation current emitted from the alpha ring of the first investigating guard electrode system on the armor of a well logging cable above the well logging sonde;

providing a cable electrode insulated from the armor of the logging cable and located between the sonde and that portion of the cable acting as a current return for the first guard electrode system, said cable electrode arranged to provide a current return for a second formation current emitted from the alpha ring of the second investigating guard electrode system and flowing in a path separate from the path of the first formation current;

simultaneously supplying a first formation current to said first alpha ring and a second formation current to said second alpha ring;

focusing said first formation current with said first system guard electrodes to direct said first formation current to flow in a path at a first lateral distance through said formation;
focusing said second formation current with said second system guard electrodes to direct said second formation current to flow in a path separate from the path of said first formation current and at a second lateral distance through said formation;
oscillating said first and second formation currents at the same frequency;
moving said well logging sonde through the borehole; and
measuring said first and second formation currents.

11. The method of claim 10 further comprising:
providing a second cable electrode insulated from the armor of the logging cable and located between the first mentioned cable electrode and that portion of the cable acting as a current return for the first guard electrode system;
measuring that portion of the voltage in phase with said first formation current and between said second cable electrode and the guard electrodes of said first guard electrode system;
measuring that portion of the voltage in phase with said second formation current and between said second cable electrode and the guard electrodes of said second guard electrode system.

12. The method of claim 10 further comprising:
providing a second cable electrode insulated from the armor of the logging cable and located between the first mentioned cable electrode and that portion of the cable acting as a current return for the first guard electrode system;
providing a third cable electrode insulated from the armor of the logging cable and located between the first mentioned cable electrode and the logging sonde;
measuring that portion of the voltage in phase with said first formation current and between said third cable electrode and the guard electrodes of said first guard electrode system; and
measuring that portion of the voltage in phase with said second formation current and between said second cable electrode and the guard electrodes of said second guard electrode system.

13. The method of claim 10 further comprising:
moving a pad mounted electrode system into contact with the borehole walls; and
measuring an electrical property of the formation immediately adjacent the borehole.

* * * * *